United States Patent [19]

Morris et al.

[11] Patent Number: 4,734,913
[45] Date of Patent: Mar. 29, 1988

[54] UNITARY SOLID-STATE LASER

[75] Inventors: Robert C. Morris, Ledgewood, N.J.; Norman G. Schroeder, Timonium, Md.; Jerry W. Kuper, Martinsville, N.J.; Michael L. Shand, Morristown, N.J.; Joseph J. Barrett, Morris Plains, N.J.

[73] Assignee: Allied Corporation, Morris Township, Morris County, N.J.

[21] Appl. No.: 809,606

[22] Filed: Dec. 16, 1985

[51] Int. Cl.$^4$ .............................................. H01S 3/04
[52] U.S. Cl. ........................................ 372/34; 372/35; 372/72
[58] Field of Search ................... 372/34, 35, 36, 72

[56] References Cited

U.S. PATENT DOCUMENTS

| | | | |
|---|---|---|---|
| 3,455,666 | 7/1969 | Bazinet, Jr. ........................ | 372/72 X |
| 3,500,238 | 3/1970 | Bazinet, Jr. et al. ............... | 331/94.5 |
| 3,528,030 | 9/1970 | Bickel et al. ........................ | 372/72 |
| 3,626,319 | 12/1971 | Gilbert ................................. | 372/34 X |
| 3,805,186 | 4/1974 | Woodcock ........................ | 372/34 X |
| 4,096,450 | 6/1978 | Hill et al. ........................ | 331/94.5 P |
| 4,170,763 | 10/1979 | Radecki et al. ................ | 331/94.5 D |
| 4,199,735 | 4/1980 | Chadwick et al. ............... | 372/36 X |
| 4,429,394 | 1/1984 | Guch, Jr. ............................ | 372/34 |
| 4,601,038 | 7/1986 | Guch, Jr. ............................ | 372/34 |
| 4,637,028 | 1/1987 | Kahan ................................ | 372/34 |

OTHER PUBLICATIONS

Alexandrite-Laser Performance at High Temperature, Steve Guch, Jr., and Carl E. Jones, dated Dec. 1982, from Optics Letters/vol. 7, No. 12, p. 608.

Primary Examiner—Eugene R. LaRoche
Assistant Examiner—Seung Ham
Attorney, Agent, or Firm—A. Jose Cortina; Gerhard H. Fuchs

[57] ABSTRACT

A simple, compact, and rugged laser comprises a solid transparent housing with two cavities. A laser medium is embedded in one cavity and a pump lamp in the other. By choosing for the housing and lamp envelope materials having thermal expansion coefficient similar to that of the laser medium, high power operation is feasible. An optional reflecting coating on the exterior of the housing enhances efficiency. An optional filter coating on the lamp envelope eliminates unwanted components of lamp radiation.

10 Claims, 5 Drawing Figures

UNITARY SOLID-STATE LASER

BACKGROUND OF THE INVENTION

1. Field of the Invention

This invention relates to an optically-pumped solid-state laser whose laser medium and pump lamp are both embedded in a transparent solid housing.

2. Description of the Prior Art

For many solid-state laser applications, a simple, compact, and rugged structure is desirable or even essential. In general, such a structure cannot be achieved if it is necessary to cool the laser medium with flowing gas or liquid. To avoid the need for fluid cooling, lasers using conduction cooling have been disclosed.

Radecki et al., in U.S. Pat. No. 4,170,763, disclosed a conductivity cooled laser pumping assembly in which the laser rod is supported by clamps that connect the ends of the rod to a heat conductive body.

Guch, in U.S. Pat. No. 4,429,394, disclosed a conduction cooled solid-state laser that has a gap between a laser crystal and pump lamp mounted in a solid housing.

SUMMARY OF THE INVENTION

In accordance with the present invention, a unitary laser comprises
  (a) a transparent, thermally-conductive solid housing,
  (b) a laser medium that has two opposite ends and is embedded in a first cavity in the housing,
  (c) a pump lamp for exciting the laser medium that is embedded in a second cavity in the housing, and
  (d) reflectors adjacent to the opposite ends of the laser medium that define an optical resonant cavity and support coherent radiation laser emitted by the laser medium. Preferably, the laser medium is alexandrite or emerald; the housing and lamp envelope are preferably sapphire.

The laser medium may have any suitable shape; e.g., rod, slab, etc. For convenience, we refer to the medium as a "rod." Because the laser rod and pump lamp are embedded in the housing, the laser of the present invention is simple, compact and rugged. By "embedded" we mean that the rod and lamp are substantially surrounded by the housing on all sides, except possibly for the ends.

DETAILED DESCRIPTION OF THE INVENTION

The present invention provides a solid-state laser that has a unitary structure; i.e., the elements of the pump chamber—laser medium, pump lamp, and optical resonator—are a unit. As a result of the unitary structure, the laser is simple, compact, and rugged.

Figure 1:
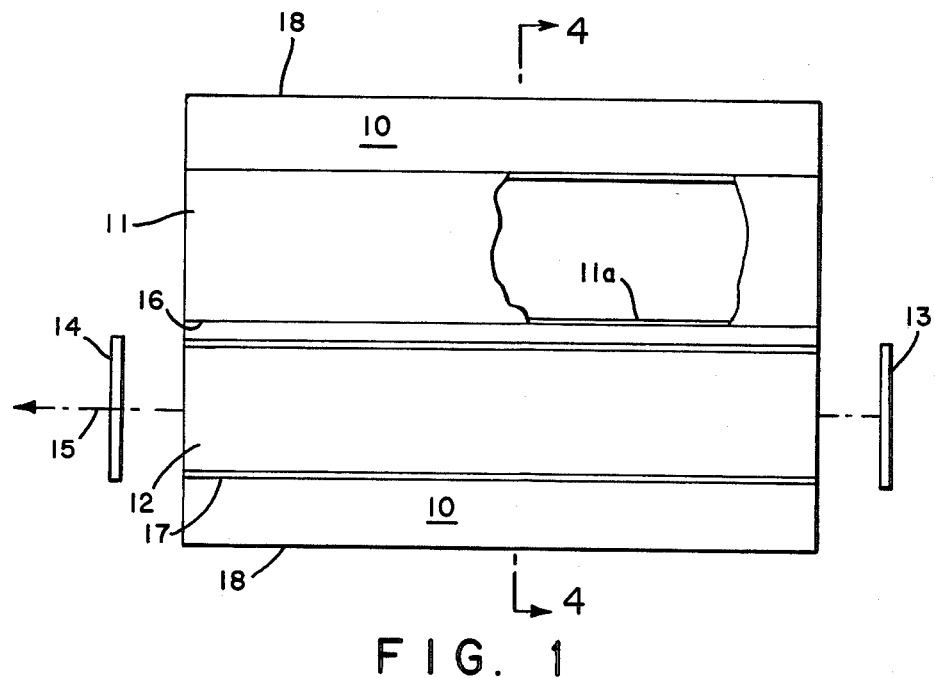
FIG. 1 is a diagramatic illustration in partial cross section of a laser apparatus of the present invention.

The construction of the pump chamber is shown schematically in FIG. 1. Embedded in transparent housing 10 is pump lamp 11 and laser rod 12. Total reflector 13 and partial reflector 14 are positioned along the axis of laser medium 12. Lasing action is evidenced by the emission of coherent radiation 15. Note that FIG. 1 depicts a separate envelope structure 11a for lamp 11; however, housing 10 may serve as the lamp envelope. Depending on the emission characteristics of the pump lamp, and the absorption characteristics of the laser rod, it may be advantageous that the pump lamp envelope 11a have a filter coating 16, to eliminate unwanted spectral components of the lamp output. A suitably chosen coating 16 will reflect back into the lamp those wavelengths (infrared and ultraviolet, for example) that do not efficiently excite the laser rod. Furthermore, elimination of the ultraviolet component can prevent solarization of the laser rod. Optionally, a bonding agent 17 may surround the pump lamp and/or the laser rod. Greater efficiency can often be achieved by having an optional reflective coating or reflective element 18 around housing 10. Silver, of course, is a good reflecting material.

Figure 2:
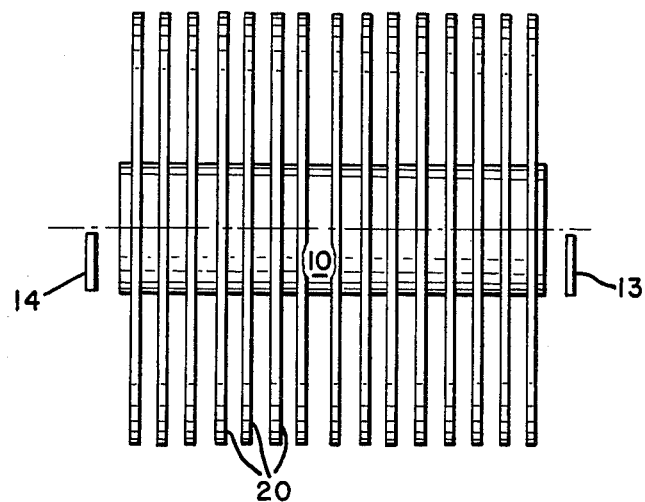
FIG. 2 is a side view of another embodiment of a laser of this invention.

FIG. 2 is a side view of an embodiment of the laser that includes radial cooling fins 20 that extend outward from housing 10.

Figure 3:
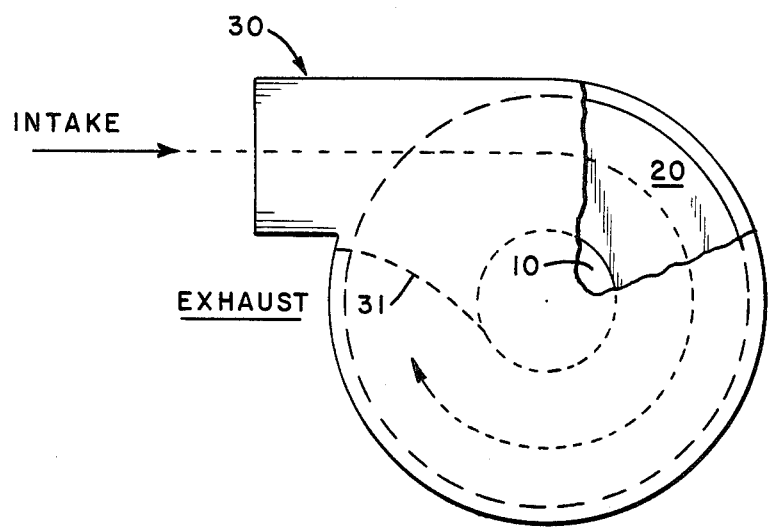
FIG. 3 is an end-on view, partially cut away, of a cooled laser of this invention.

FIG. 3, is an end-on view, depicts an embodiment in which the cooling provided by fins 20 is augmented by a flow of coolant between the fins 20 and around the outside of housing 10. The coolant flow is directed through a shroud 30, which includes a baffle 31 that extends between the fins and deflects the coolant out of the shroud. Flowing a cooling fluid, such as air or water, over the outside of the housing places far fewer constraints on the system then does the conventional method of flowing fluid over the laser rod or lamp envelope. When fluid cools the laser rod or lamp directly, its optical properties are important, and it must be stable despite being subjected to higher temperatures and radiation levels. Extreme cleanliness is essential, and any residue from the fluid can have a strong detrimental effect on laser performance.

Figure 4:
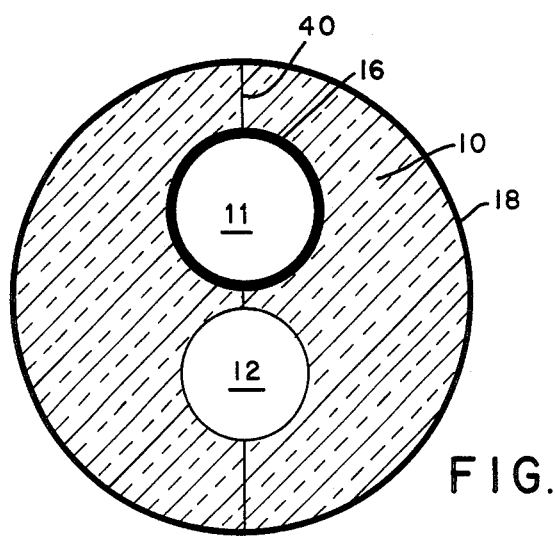
FIG. 4 is a cross-sectional view of the apparatus of FIG. 1.

FIG. 4 is a sectional view taken along the line 4—4 in FIG. 1. It shows circular cross sections for housing 10, pump lamp 11, and laser rod 12. Also shown are filter coating 16 and reflective coating 18. In the embodiment shown, the housing comprises two semicylindrical sections joined at surface 40. Such a "clam shell" structure facilitates removal and replacement of the pump lamp and laser rod and reduces thermal stresses. Alternatively, the housing may simply be of one piece, with cavities for the lamp and rod.

Figure 5:
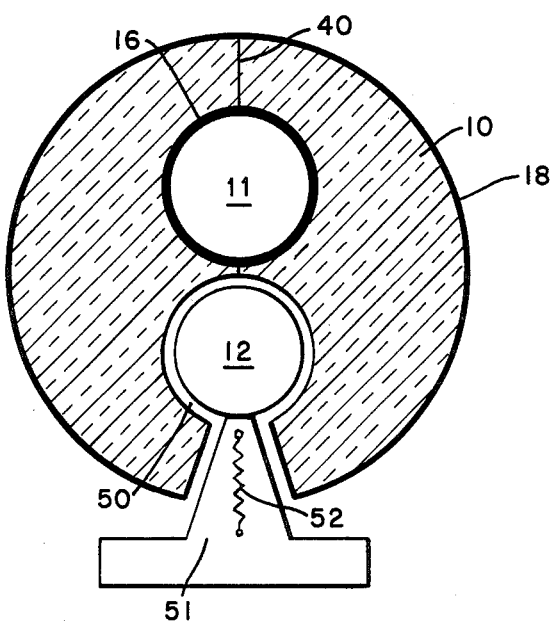
FIG. 5 is a cross-sectional view of another apparatus of the present invention.

FIG. 5 is a sectional view of another embodiment of the present invention. In that embodiment, the diameter of laser rod 12 is slightly smaller than that of its cavity in housing 10, leaving an annular gap 50. Thus, conductive heat flow between rod 12 and housing 10 is greatly reduced. The laser rod may be supported by support 51, which optionally may include a conventional heater 52. The configuration shown in FIG. 5, with heater 52, is particularly preferred when it is desired to operate the laser medium—alexandrite, for example—at an elevated temperature. The heater permits the user to bring the laser rod to an elevated temperature before lasing is begun, and gap 50 provides insulation to minimize the heat being conducted away by housing 10. Thus, an alexandrite laser having that structure can provide efficient (i.e., high-temperature) operation from the onset of lasing.

During laser operation, the laser rod, pump lamp, and housing all heat up. Thus, laser media like alexandrite and emerald, whose output efficiency are not diminished at elevated temperatures, are preferred. Unless there is a gap between the laser rod or lamp and the cavity that contains it, high temperature operation would cause excessive stresses to build up if the thermal expansion coefficient of the housing is substantially different from that of the laser rod or pump lamp envelope materials. Thus, for high power operation, it is preferred that the laser rod and lamp envelope have thermal expansion coefficients similar to that of the housing. The thermal expansion coefficient difference that can be tolerated depends on the temperature at which the element (lamp or laser rod) will operate, the clearance between the element and the cavity wall, and the strength of the element and housing.

An important criterion for the choice of lamp envelope and housing materials is that they transmit in the wavelength region of the laser pump bands. Typical of materials that are suitable are certain glasses, fused silica, quartz, chrysoberyl, and sapphire. Sapphire and fused silica are preferred envelope materials, because they are suitable and are available commercially. Sapphire is a preferred housing material because of its superior thermal shock resistance. Glass moldings are also suitable for housings. The relevant parameters that guide the choice of materials in a particular instance—e.g., transmission spectra, thermal conductivity, and thermal expansion coefficient —are tabulated in reference works such as the American Institute of Physics Handbook, published by McGraw-Hill.

If the laser is intended to have a long lifetime, then the need to replace lamps and laser rods dictates a clam shell structure and no bonding agent. If a bonding agent is used, it is convenient to first provide it as a powder, surrounding the laser rod or lamp envelope in the housing cavity, and to then thermally fuse it. The criteria for bonding agents, like those for the housing and lamp envelope, include high optical transmission in the spectral region of interest and good match of thermal expansion coefficient. In addition, the bonding agent should have a melting point that is low enough that the agent can be melted (and solidified) without damaging the laser medium, lamp, or housing. Finally, the bonding agent should not deteriorate during exposure to the heat and radiation generated by the lamp. Low melting glasses; certain polymers, such as silicone elastomers; and other similar materials, well known in the art, are suitable bonding agents.

We claim:

1. A unitary laser comprising:
   (a) a transparent, thermally-conductive solid housing;
   (b) a laser medium that has two opposite ends and is embedded in a first cavity in the housing;
   (c) a pump lamp for exciting the laser medium that is embedded in a second cavity in the housing,
   (d) a filter coating on said pump lamp and extending around the pump lamp for eliminating unwanted components of the lamp output which do not efficiently excite the laser medium by reflecting back into said pump lamp components of the lamp output that do not efficiently excite the laser medium; and
   (e) reflectors adjacent to the opposite ends of the laser medium that define an optical resonant cavity and support coherent radiation emitted by the laser medium.

2. A unitary laser comprising:
   (a) a transparent, thermally conductive solid housing, said housing comprising two semicylindrical sections joined at one surface to be moveable between a first open position and a second closed position;
   (b) a laser medium that has two opposite ends and is embedded in a first cavity in said housing which is defined by said housing when in said second closed position;
   (c) a pump lamp for exciting the laser medium, said pump lamp embedded in a second cavity in said housing which is defined by said housing when in said second closed position;
   (d) a filter coating on said pump lamp and extending around the pump lamp for eliminating unwanted components of the lamp output which do not efficiently excite the laser medium by reflecting back into said pump lamp components of the lamp output that do not efficiently excite the laser medium; and
   (e) reflectors adjacent to the opposite ends of the laser medium that define an optical resonant cavity and support coherent radiation emitted by the laser medium, whereby the laser rod and pump lamp, which are held in said housing when in said second closed position, can be easily removed for cleaning or replacement.

3. The laser of claim 1 in which the laser medium has a thermal expansion coefficient similar to that of the housing.

4. The laser of claim 2 in which the laser medium has a thermal expansion coefficient similar to that of the housing.

5. The laser of claim 1 in which the lamp has an envelope whose thermal expansion coefficient is similar to that of the housing.

6. The laser of claim 2 in which the lamp has an envelope whose thermal expansion coefficient is similar to that of the housing.

7. The laser of claim 1 in which the lamp envelope comprises sapphire or fused silica.

8. The laser of claim 2 in which the lamp envelope comprises sapphire or fused silica.

9. The laser of claim 1 in which the laser medium comprises alexandrite or emerald.

10. The laser of claim 9 further comprising heating means for the laser medium and a gap between the laser medium and the housing.

* * * * *